United States Patent Office 2,762,589
Patented Sept. 11, 1956

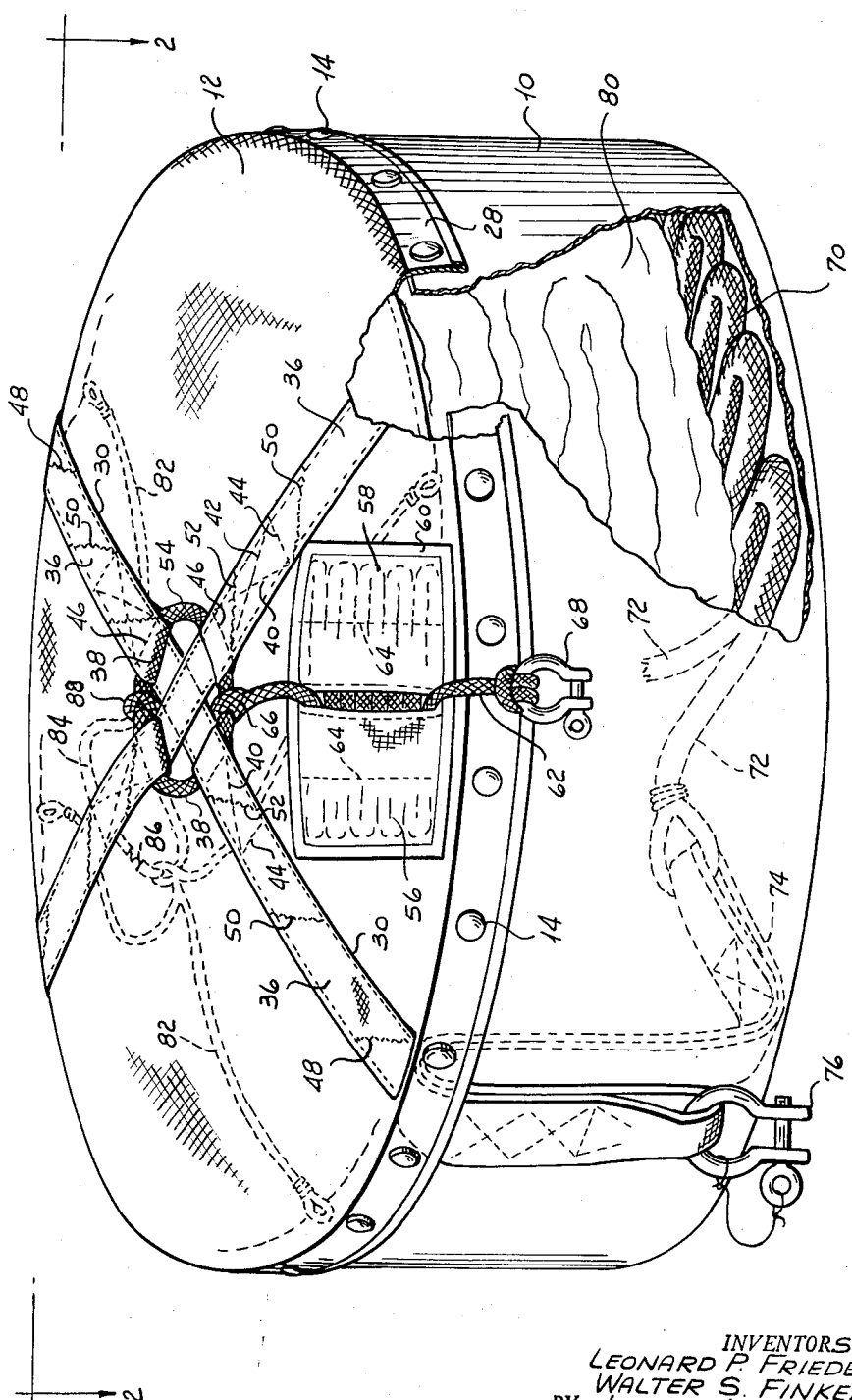

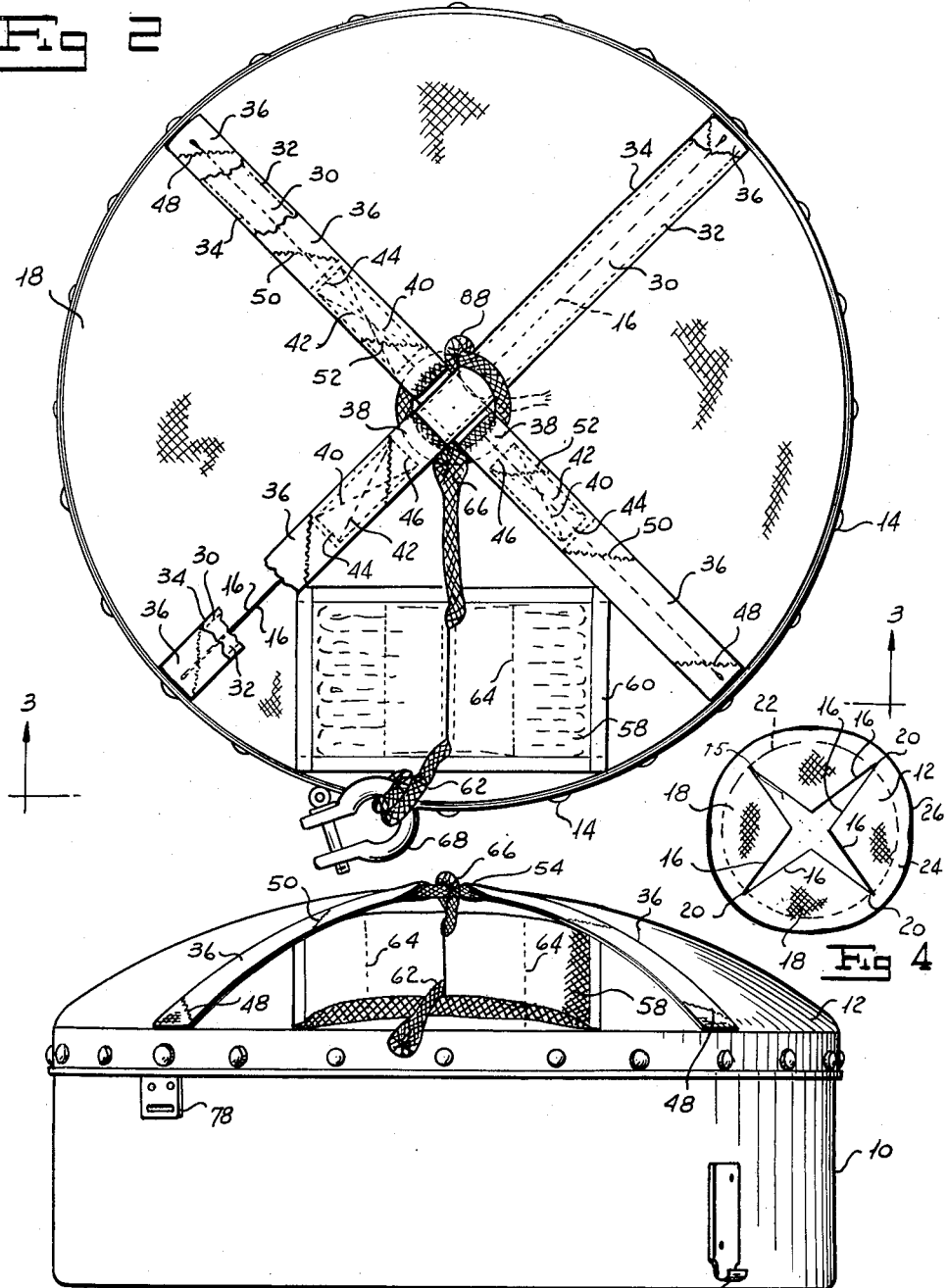

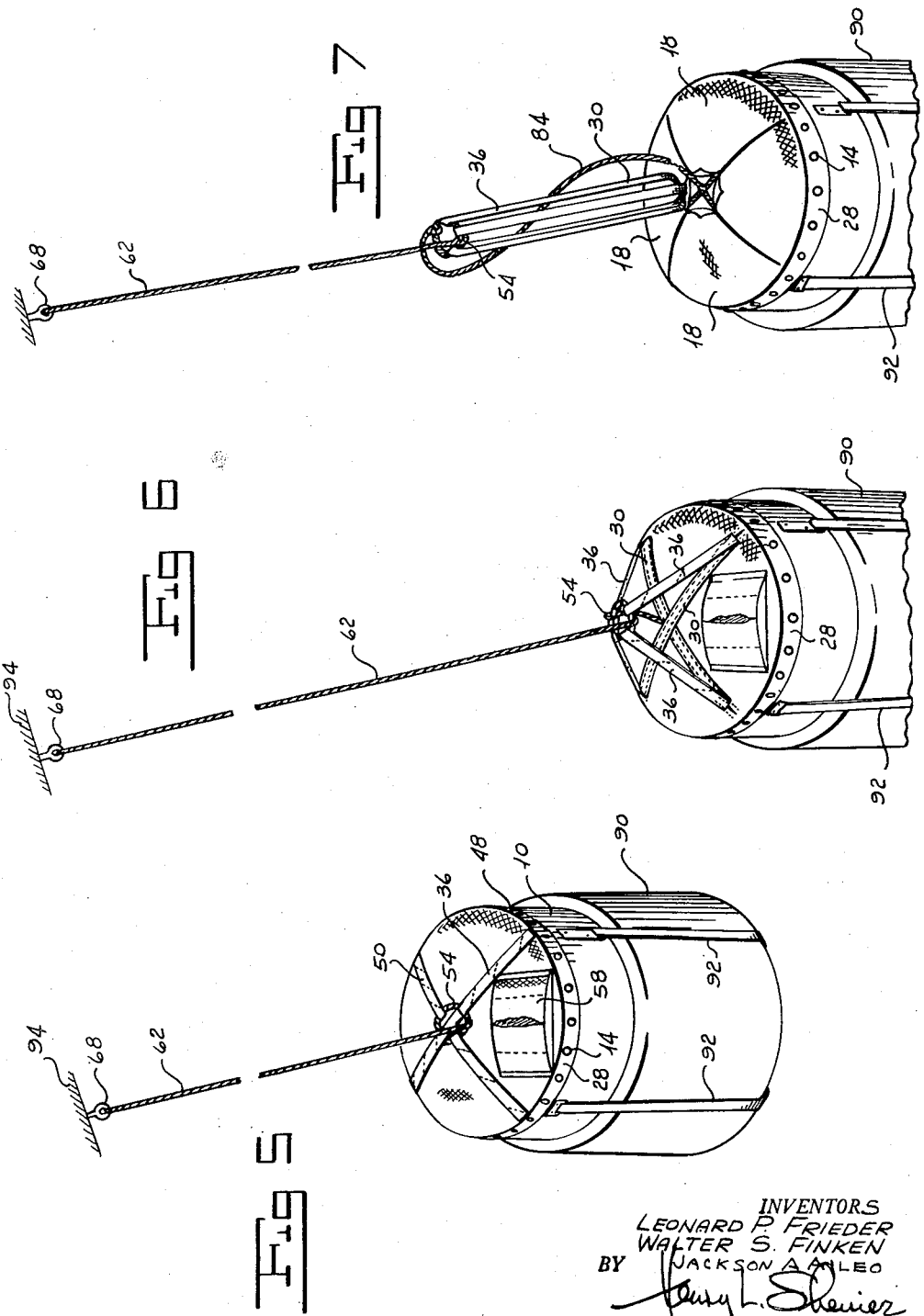

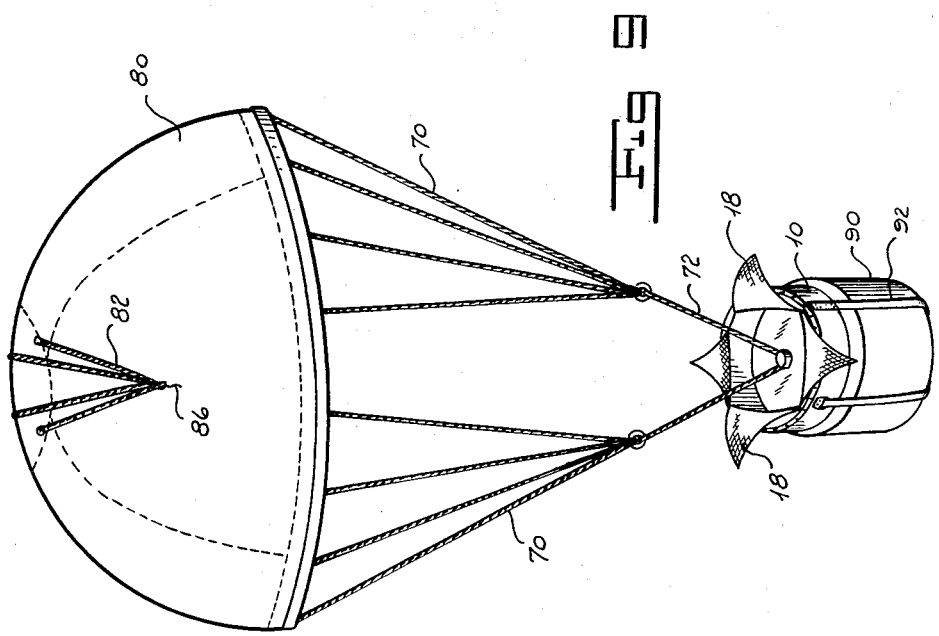
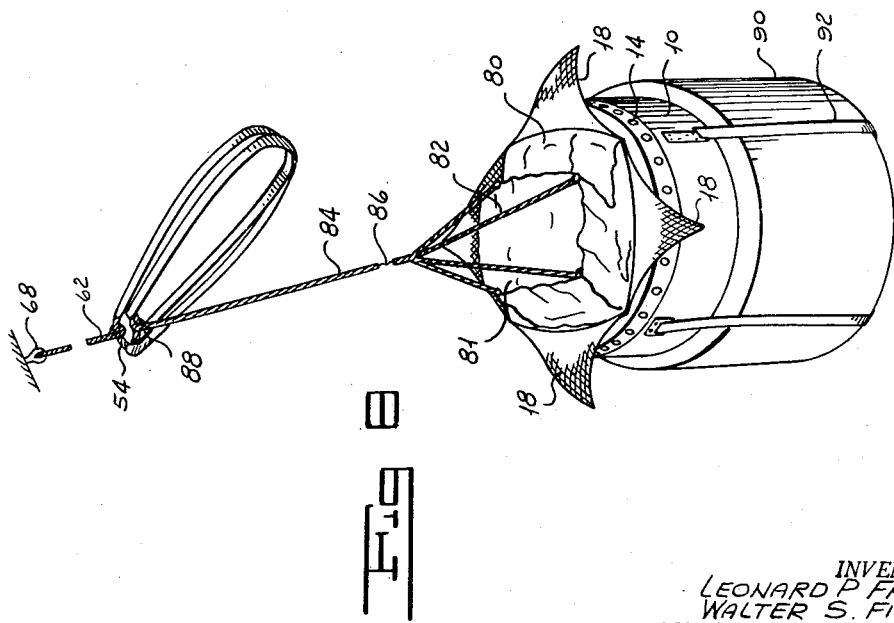

2,762,589

PARACHUTE PACK

Leonard P. Frieder, Great Neck, and Walter S. Finken, Brooklyn, N. Y., and Jackson A. Aileo, Carbondale, Pa.; said Finken and said Aileo assignors to said Frieder Application November 1, 1952, Serial No. 318,254

4 Claims. (Cl. 244—148)

Our invention relates to parachute packs and more particularly to an improved pack for cargo parachutes to be used for launching or dropping material from aircraft.

In Patent 2,467,024, dated April 12, 1949, there is shown one form of parachute pack comprising a container for the parachute, a cover for the container and rupturable means operated by the pull on a static line for releasing the parachute in a timed sequence of operations.

The instant invention is an improvement in the parachute pack shown in Patent 2,467,024. It is desirable to seal the parachute in its pack against moisture, insects and the like in order to protect the parachute over long periods of time preparatory to its use. It is also desirable to store the parachute in folded condition within a restricted space. In order to be able to fold the parachute properly within a restricted space, the pack must be completely open at the top and after folding, the pack must be compressed to occupy a minimum volume.

To achieve this feature of packing a parachute into a reduced volume, we employ a cover for the pack using a single area of fabric having a radius greater than the radius of the circular space in which the parachute is positioned and to which the cover is attached.

One object of our invention is to provide an improved parachute pack enabling a parachute to be stored within a minimum space.

Another object of our invention is to provide an improved parachute pack adapted to protect the parachute against moisture, insects, and the like.

Another object of our invention is to provide a parachute pack normally sealed to protect the parachute in which the cover of the pack is rapidly, safely, and quickly opened without injury to the parachute.

A further object of our invention is to provide a parachute pack having a removable cover secured by frangible means in which the frangible means are rendered ineffective in predetermined timed relation in such a manner as to avoid all damage to or fouling of the parachute.

Other and further objects of our invention will appear in the following description.

In general our invention contemplates the provision of a base or housing for the parachute to which the load may be conveniently attached if desired. The parachute and its shroud lines are folded in the base container and provided with a cover of fabric. The container may conveniently be cylindrical, though it is to be understood it may take any desired form. In the case of a cylindrical container, the radius of the cover is greater than the radius of the base so that the cover in holding the parachute in the base will assume an arcuate contour. The cover is cut in such a manner that the perimeter of the greater fabric area is equal to the coacting perimeter of the pack base to which the cover is fitted. The cover is formed of a plurality of generally triangular flaps which are secured to each other by stitching to sealing tapes. Improved means for ripping these tapes to free the cover flaps are provided.

In the accompanying drawings which form part of the instant specification and which are to be read in conjunction therewith and in which like reference numerals are used to indicate like parts in the various views:

Figure 1 is a perspective view of a pack showing one embodiment of our invention with parts broken away.

Figure 2 is a top plan view of the parachute pack shown in Figure 1.

Figure 3 is a side elevation of the parachute pack shown in Figure 2 viewed along the line 3—3 of Figure 2.

Figure 4 is a top plan view of the cover fabric drawn on a small scale showing the method of cutting the cover fabric.

Figure 5 is a view showing the position of parts with a static line pulled out of its pocket.

Figure 6 is a perspective view showing the position of parts with the upper tape portions broken away from the lower tape portions.

Figure 7 is a perspective view showing portions of the lower tape portions ripped away from the fabric cover, freeing the cover flaps.

Figure 8 is a perspective view of the parts showing the crown bridle in the position pulling the parachute from the pack base.

Figure 9 is a perspective view showing the parachute free of the static line and in descent after being launched from an aircraft.

Referring now to Figure 1, the pack base 10 may be made of any appropriate material and have any desired cross sectional shape. For purposes of convenience we have shown the pack as a cylindrical box open at the top. The box may be made of light sheet metal, or laminated glass filament fabric impregnated with a plastic such as phenol condensation products or the like. The pack may be made of a synthetic resin molded to form. The base 10 is provided with a cover 12, the periphery of which may be secured to the upper edge of the base 10 in any appropriate manner. We have shown the periphery of the cover 12 secured to the upper edge of the base 10 by a plurality of heavy snap fasteners 14. It will be understood of course, as is well known in the art, that the periphery of the cover 12 may be laced to the base. It may be secured by a metal hoop. It is only necessary that the periphery of the fabric be securely fastened to the upper periphery of the base so that in the subsequent operation of removing the frangible cover sector securing means, the cover will not be removed from the base at its periphery and thus disturb the desired sequence of operations.

Referring now to Figure 4, the cover 12 is formed of a single piece of stout fabric which may be a duck or the like made of any suitable fiber such as nylon, rayon, cotton, or the like. The radius of the cover 12 is greater than the radius of the base. A plurality of wedge-shaped sectors 15 are cut out of the fabric cover as shown in Figure 4 along radii 16 which are equal to the radius of the pack base. Radii 16 thus form the lateral boundaries for a plurality of generally triangular sectors 18, which form the cover flaps. It will be seen that when the adjacent edges 16 of the sectors 18 are sewed together by tapes, the cover will assume a generally arcuate form with the circle 22 passing through the apices 20 of the wedge-shaped pieces 15 (which were removed) lying along the perimeter of the pack base to which the cover is fitted. In this manner the perimeter of the greater fabric area is formed to be substantially equal to the smaller perimeter of the pack base with which the closure is associated. It is to be understood that this method of cutting can be applied to any polygonal area as will be readily understood by those skilled in the art. We have shown a cylindrical pack for purposes of illustration and not by way of limitation. The annular area 24 between the edge 26 of the fabric and the dotted line circle 22 through the apices 20 forms a flange integral with the cover without resorting to an additional peripheral seam. This annular area may be reinforced by a tape 28 to form the finished flange, as can be seen by reference to Figure 1. It is by means of this flange that the periphery of the cover 12 is secured to the pack base 10 by means of the snap fasteners or by any other appropriate means.

While we have shown four wedge-shaped pieces removed to form four sectors 18, it is to be understood that any appropriate number of wedge-shaped pieces may be removed.

The adjacent edges 16 formed by the removal of the wedge-shaped sectors 15 are brought together as shown in Figure 2 and secured to each other by means of a plurality of tapes 30 sewn along seams 32 and 34 as can be seen by reference to Figure 2. In the construction shown there are two tapes, each of which is approximately twice the diameter of the cover. When the two tapes are crossed at right angles and sewn along the seams 32 and 34, they are symmetrically disposed. Each of the tapes will have portions approximately equal to the radius of the cover, unsecured to the cover at this point in the fabrication. The free ends of the tapes, indicated by the reference numeral 36, are folded back along the tape portions 30, already stitched to the cover, to bring the ends of the tapes toward the center. At the center the ends of the tapes are provided with loops 38, formed by doubling back the terminal portions of the tapes and stitching them to the folded back portions by seams 40, 42, 44, and 46, as can be seen by reference to Figure 2. The folded back tape portions 36 thus provided with loops 38, are stitched in place by diagonal rows of stitches 48, 50, and 52, as can readily be seen by reference to Figure 2. A circular grommet 54 is passed through the loops 38.

The cover has secured thereto fabric pieces 56 and 58 by means of a marginal tape 60. The pieces 56 and 58 form a pocket in which a static line 62 is faked and secured in position for running by means of brailing stitches 64. One end of the static line is formed with an eye 66 through which the grommet 54 passes. The other end of the static line is formed with a shackle 68 which is secured to a portion of the aircraft. The parachute is provided with shroud lines 70 which are faked free for running in the bottom of the pack base 10. The shroud lines terminate in a pair of rattails 72 which are secured to a pair of riser straps 74, the ends of which are provided with shackles 76 for securing the parachute to the load. The parachute pack base 10 may be, as shown in Figure 3, provided with fittings 78 appropriately secured thereto at suitable intervals for attaching a load to the pack base 10. Above the shroud lines 70 the parachute canopy 80 is folded for easy streaming from the pack to a position where it can be distended. Secured to the crown of the parachute we provide a bridle 82. The bridle can be readily seen by reference to Figures 1, 8, and 9. The bridle 82 is attached to a bridle lanyard 84 by means of a weak link 86. The weak link may be a short length of nylon cord having a predetermined strength, depending on the size of the canopy which is to be pulled from the pack. The end of the bridle lanyard is provided with an eye 88 through which the grommet 54 extends. It will be seen that the static line is secured to the grommet and that the bridle lanyard is secured to the grommet. The bridle lanyard is secured to the bridle 82 by means of a weak link 86 and the ends of the bridle are attached to the crown 84 of the parachute canopy 80. The parachute is assembled in the pack as just described and compressed into the pack. The cover is placed over the folded parachute and secured in position by attaching the peripheral flange 20 of the cover to the perimeter of the pack 10. The parachute, when assembled, will be in the position shown in Figures 1, 2, and 3, it being understood that the static line is positioned in its cover pocket.

Let us assume that a load 90 is secured to the pack base 10 in any appropriate manner, as for example, by tapes 92 as shown in Figure 5. The end of the static line 62 is secured to an aircraft part 94 by means of the shackle 68. Let us assume further that it is desired to launch a load to the ground from a flying aircraft. The load 90 is pushed from the craft and it falls by gravity. In so doing, the tug of the load transmitted through the pack base 10 and the cover 12, rips the light brailing stitches 94 permitting the static line 62 to be drawn out of the pocket. The position of the parts at this instant is shown in Figure 5. When the static line becomes fully extended, it tugs upon the grommet 54 which, we have seen, passes through the loops 38 formed at the ends of the tape portions 36. The tug of the static line under the influence of the load rips the biased securing stitches 52, 50, and 48, thus freeing the portions 36 of the tapes 30. At this instant the position of the parts is shown in Figure 6. The continued pull from the static line through the grommet 54 and through the tape portions 36 will rip the stitching 32 and 34, pulling the tapes free from the edges of the cover sectors 18. At the same time the bridle lanyard 84 will be pulled out of the center of the pack. At this instant the position of parts is shown in Figure 7. Continued pull from the static line through the grommet 54 through the bridle lanyard 84 through the weak link 86 will pull the bridle 82 upwardly starting the crown 81 of the parachute out of the pack and in so doing, drawing back the cover sectors 18. At this instant, the position of the parts is shown in Figure 8. The bridle continues to pull the parachute canopy 80 and the shroud lines 70 out of the pack base 10 until the parachute becomes fully extended. If the weak link 86 is not broken before this by a sudden stress, the jerk of the load 90 through the rattails 72 through the shroud line 70 through the canopy 80 through the bridle 82 upon the weak link 86 will rupture the weak link and free the parachute for descent to the earth.

It will be seen that we have accomplished the objects of our invention. We have provided a compact parachute pack in which the parachute is protected against moisture, insects and the like until the parachute is ready for use. The parachute is secured in the pack by a cover formed with a plurality of sectors from the periphery of the parachute base toward the center. In this manner the parachute may be readily pulled out of the pack without fouling. The parachute is held in the pack until the tapes are pulled clear of the cover. The cover then becomes freed and the relative motion of the load with respect to the static line will pull the parachute out of the pack by its crown in a manner to prevent fouling of the parachute canopy and to insure successful operation of the parachute. After the parachute is inflated, the bridle is detached from the static line through a rupturing of the weak link. It will be observed that the securing tapes are simultaneously ripped radially of the cover from the perimeter toward the center. This makes for an extremely rapidly opening pack.

It will be understood that at high speeds and under heavy loads the sequence of operations is extremely rapid. At high speeds it is important that the pack is opened symmetrically and rapidly if danger of fouling the parachute canopy is to be avoided.

We are enabled to store a parachute in a small volume, protected while it is stored and yet free it from its pack in unfouled condition rapidly, expeditiously, and safely.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A parachute pack having a substantially rigid base housing and a cover of flexible material, said cover being formed by a plurality of generally triangular sectors having their bases integral with the cover material and their apices disposed substantially centrally of the cover, said sectors being formed by cutting the cover material along substantially radial lines, rip tapes sewed to adjacent sides of respective sectors for securing them to each other, each rip tape being folded back upon itself, means for flexibly securing the folded back portions of the rip tapes to the cover, means tying the ends of the rip tapes together substantially at the center of the cover, means for attaching the periphery of the cover to the upper perimeter of the base, a parachute folded in the base and held therein by the cover, a static line adapted to be secured to an aircraft and means connecting the static line to the rip tape tying means.

2. A parachute pack as in claim 1 in which the rip tape ends are formed with loops, and said tying means comprises a grommet passing through the loops.

3. A parachute pack having a substantially rigid base housing and a cover of flexible material, said cover being formed by a plurality of generally triangular sectors having their bases integral with the cover material and their apices disposed substantially centrally of the cover, said sectors being formed by cutting the cover material along substantially radial lines, rip tapes sewed to adjacent sides of respective sectors for securing them to each other, said rip tapes having their ends formed with loops and disposed centrally of the cover, means for attaching the periphery of the cover to the upper periphery of the base housing, a parachute folded in the base housing, said parachute being formed with a crown, a crown bridle attached to the parachute crown, a static line adapted to be secured to the aircraft, a grommet passing through the rip tape loops, one end of the static line being secured to the grommet, a crown bridle lanyard, means including a weak link connecting one end of the crown bridle lanyard to the crown bridle and means for connecting the other end of the crown bridle lanyard to the grommet.

4. A parachute pack having a substantially rigid base and a cover of flexible material, said cover being formed of a single piece of flexible material having a perimeter larger than the perimeter of the upper portion of the base, said cover being formed by removing a plurality of triangular pieces of material, each of the triangles of which has its apex disposed along the locus of a perimeter equivalent of the perimeter of the upper portion of the base, and each of the bases of which lies adjacent the center of the cover, thereby to form a plurality of generally triangular sectors having their bases integral with the cover material and their apices disposed substantially centrally of the cover, rip tapes secured to adjacent sides of respective sectors securing them to each other, the material of the cover extending beyond the locus of the apices of the removed triangular pieces forming a peripheral flange, means for securing the peripheral flange to the upper periphery of the base, a parachute folded in the base, a static line adapted to be secured to an aircraft, means for connecting the static line to the rip tapes, a reinforcing tape and means for securing the tape to the peripheral flange.

References Cited in the file of this patent

UNITED STATES PATENTS

| | | |
|---|---|---|
| 2,565,470 | Brown | Aug. 28, 1951 |
| 2,577,737 | Brown | Dec. 11, 1951 |

FOREIGN PATENTS

| | | |
|---|---|---|
| 734,694 | France | Aug. 8, 1932 |
| 739,231 | Germany | Sept. 15, 1943 |